April 18, 1961     O. C. ECKEL     2,980,198
ASSEMBLY OF SOUND ABSORBING MEMBERS
Filed July 27, 1959
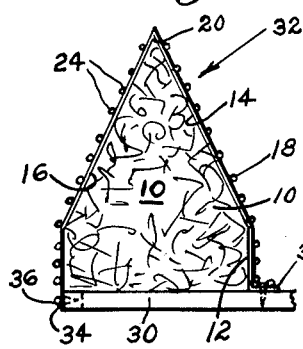
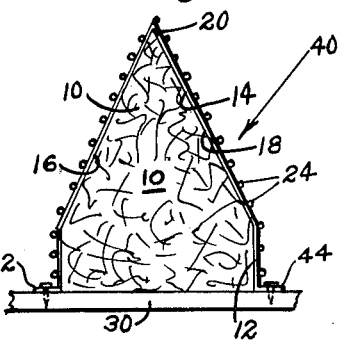
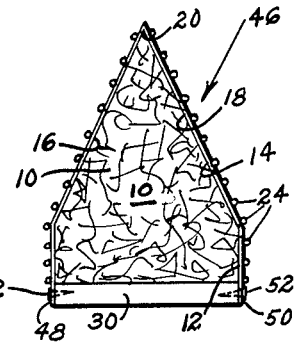
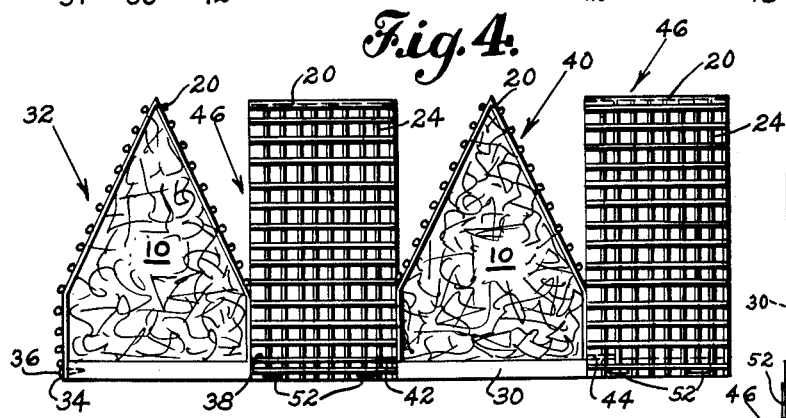
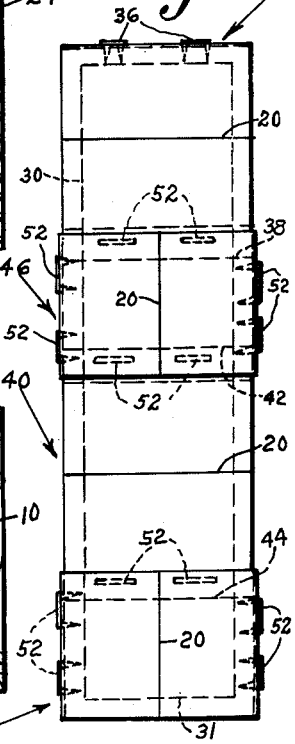
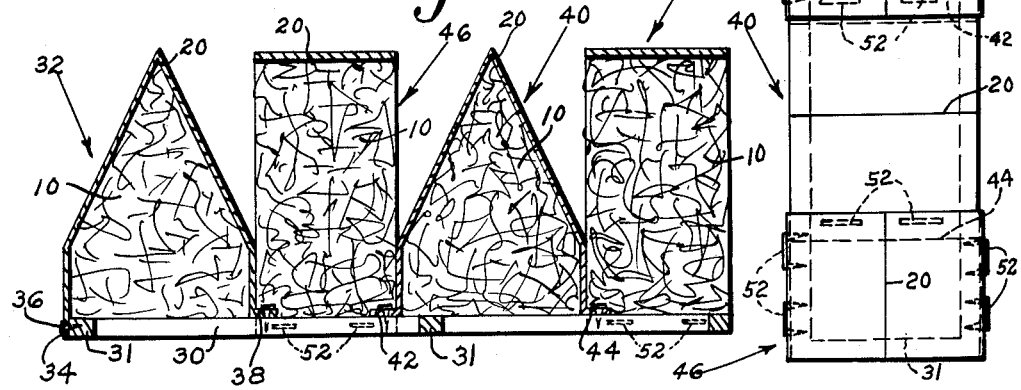
INVENTOR.
Oliver C. Eckel
BY Harold E. Cole
Attorney

United States Patent Office 2,980,198
Patented Apr. 18, 1961

2,980,198

ASSEMBLY OF SOUND ABSORBING MEMBERS

Oliver C. Eckel, 155 Fawcett St., Carlisle 38, Mass.

Filed July 27, 1959, Ser. No. 829,660

4 Claims. (Cl. 181—33)

This invention relates to an assembly of sound absorbing members for use in rooms, chambers and the like.

One object of my invention is to provide an assembly of sound absorbing members having outer, wedge-shaped portions so constructed that a relatively large number can be assembled and attached on one supporting frame, which frames are attached to a wall, ceiling or the like to provide a sound absorbing lining that absorbs sound with a minimum of reflected waves.

Another object is to provide a sound absorbing member with an outwardly directed flange or terminal portion at one or both sides, and so utilize it in cooperation with one or more other members in the assembly that the latter members serve as retainers for the member having a flange.

Another object is to so construct said sound absorbing members that the above objects are attained by only slight additions to said members and at a negligible cost.

The foregoing and other objects which will appear as the nature of the invention is better understood, may be accomplished by a construction, combination and arrangement of parts such as is disclosed by the drawing. The nature of the invention is such as to render it susceptible to various changes and modifications, and therefore, I am not to be limited to the construction disclosed by the drawing, nor to the particular parts described in the specification; but am entitled to all such changes therefrom as fall within the scope of my claims.

In the drawing:

Fig. 1 is a side elevational view of one of the sound absorbing members used in my assembly, shown attached to a supporting frame.

Fig. 2 is a side elevational view, similar to Fig. 1, of another said sound absorbing member.

Fig. 3 is a side elevational view, similar to Fig. 1, of another said sound absorbing member.

Fig. 4 is an elevational view showing an assembly of said sound absorbing members.

Fig. 5 is a longitudinal sectional view of the assembly shown in Fig. 4.

Fig. 6 is another elevational or top view showing my assembly in position of use with the dihedral edges of the sound absorbing members at the front, omitting the wire mesh covers.

As illustrated, each member or element has a main body 10 that is made of mineral wool, acetate wool or similar sound absorbing material, and takes the shape shown. An inner end or base portion 12 of said body is rectangular in cross section, from which a triangular or wedge-shaped portion 14 extends to the outer end of said main body. The tapering sides 16 and 18 of said body terminate in a dihedral outer edge 20. This is the well-known shape of a so-called wedge member used as an interior lining for a room or other enclosure to provide it with sound absorbing qualities. These wedge members are duplicates, except for extensions and flanges later described.

Said tapering sides 16 and 18 of said body are covered with an open-work sheet such as a wire mesh cover 24, although cloth, reinforced by cardboard, or other material could be used therefor. The other two sides are left uncovered.

A supporting frame or base 30, which is made of firm material, such as wood, is of rectangular outline as shown, reinforced by cross pieces 31. Its position is innermost in use, and it supports a plurality of said elements or wedge members and may be fastened to a wall or the like by clips or other well known means. The positions of the wedge members, in an assembly, alternate, with said dihedral outer edges 22 extending at right angles to each other, as illustrated in said Figs. 4 and 5 and 6, and with the body inner portions 12 abutting each other as shown in Figs. 4 and 5.

A wedge member 32, shown in said Fig. 1, would occupy an outer portion in an assembly such as shown in Figs. 4 and 5. It has an extension or terminal portion 34 integral with said wire cover 24 and extends beyond said body 10 of sound absorbing material, being opposite said supporting frame 30. Staples 36 attach it to an outer edge of the latter. At the opposite side, said wedge member has an angular flange portion 38 that extends outwardly from the front end of said body 10 at a right angle as shown.

A wedge member 40 shown in said Fig. 2 has two angular flange or terminal portions 42 and 44 at opposite sides, which are integral with said cover 24 and extend outwardly from the front end of said body 10.

A wedge member 46 shown in said Fig. 3 has two extension or terminal portions 48 and 50 at opposite sides integral with said cover 24, and similar to said extension portion 34, both being attached by staples 52 to said supporting frame 30.

In forming my assembly, said wedge member 32 may be placed at one end and its extension 34 fastened, as at 36, to said supporting frame 30, and said flange portion 38 may also be fastened, although that is not necessary.

Said wedge member 46 is next placed with its dihedral edge 22 at a right angle to the dihedral edge of said wedge member 32, and a portion of its body 10 of sound absorbing material contacts said angular flange 38. Staples 52 at opposite sides attach this wedge member 46 to said frame 30.

Said wedge member 40 is next positioned in the same way as previously described for said wedge member 32, with a portion of the body of sound absorbing material of said wedge member 46 in contact with flange 42 of said member 40.

Another wedge member 46, the same as previously described and shown in said Fig. 3, next occupies a position next to said wedge member 40, being positioned and held as previously described for the first-mentioned wedge member 46. A portion of its body of sound absorbing material is in contact with said flange 44. Its extensions or terminal portions 48 and 52 are stapled to said supporting frame 30 by staples 52.

This alternate arrangement of wedge members on a said frame 30, may continue as needed, and a said wedge member 32, if used at the right end of said assembly as shown in said Fig. 4, will have its position reversed from that taken at the left end, so that said flange 38 is at the left and in contact with a portion of the body of a said wedge member 46 that is next to it.

Since said wedge member 46 is stapled, at opposite sides, to said frame 30, said flanges of said members 32 and 40 need not be stapled or otherwise attached to said frame 30, although attachment may be made if desired.

What I claim is:

1. An acoustic assembly comprising a frame base, at least two sound absorbing elements on said frame, said elements having polygonal base portions and outwardly extending wedge-shaped portions, said elements being arranged with their base portions adjacent each other, a sheet-like, open-work cover extending over each of said elements having terminal portions on opposite sides of said elements, said terminal portions being attached to said base.

2. An acoustic assembly comprising a frame base, at least two sound absorbing elements on said frame, said elements having polygonal base portions and outwardly extending wedge-shaped portions, said elements being arranged with their base portions adjacent each other, a sheet like, open-work cover extending over each of said elements having terminal portions on opposite sides of said elements, said elements being so positioned on said frame that the said open-work cover of a first said element extends angularly to the said open-work cover of the next adjacent of said elements, one of said terminal portions of the first of said elements extending to a point opposite to and attached to an edge of said frame and the other one of said terminal portions thereof extending angularly outward away from the said base portion thereof, the two said terminal portions of the second of said elements extending, and being attached, to opposite edges of said frame, said second element being in overlapping relationship to and in contact with said angular terminal portion.

3. An acoustic assembly comprising a frame base, at least three sound absorbing elements on said frame, said elements having polygonal base portions and outwardly extending wedge-shaped portions, said elements being arranged with their base portions adjacent each other, a sheet like, open-work cover extending over each of said elements having terminal portions on opposite sides of said elements, said elements being so positioned on said frame that the said open-work cover of a second said element extends angularly to the said open-work cover of the first and third of said elements, one of said terminal portions of the first of said elements extending to a point opposite to and attached to an edge of said frame and the other one of said terminal portions thereof extending angularly outward away from the said base portion thereof, the two said terminal portions of the second of said elements extending, and being attached, to opposite edges of said frame, said second element being in overlapping relationship to, and in contact with, said angular terminal portion, one said terminal portion of the third said element extending angularly outward away from the said base portion thereof, said second element being in overlapping relationship to, and in contact with, said angular terminal portion of the third said element.

4. An acoustic assembly comprising a frame base, at least four sound absorbing elements on said frame, said elements having polygonal base portions and outwardly extending wedge-shaped portions, said elements being arranged with their base portions adjacent each other, a sheet like, open-work cover extending over each of said elements having terminal portions on opposite sides of said elements, said elements being so positioned on said frame that the said open-work covers of the first and third said elements extend angularly to the said open-work cover of the second and fourth said elements, one of said terminal portions of the first of said elements extending to a point opposite to and attached to an edge of said frame and the other one of said terminal portions thereof extending angularly outward away from the said base portion thereof, the two said terminal portions of a second of said elements extending, and being attached, to opposite edges of said frame, said second element being in overlapping relationship to, and in contact with, said angular terminal portion, both of said terminal portions of the third said element extending angularly outward away from the said base portion thereof, and said second element being in overlapping relationship to, and in contact with, one of said angular terminal portions of the third said element, the two said terminal elements of the fourth said element extending, and being attached, to opposite sides of said base, said fourth element being in overlapping relationship to, and in contact with, the other of said angular terminal portions of the third said element.

References Cited in the file of this patent

UNITED STATES PATENTS 2,341,305     Woodworth _____ Feb. 8, 1944

OTHER REFERENCES

Electronic Industries, "Acoustic Laboratory," March 1946 issue, page 78.

Construction Methods, "Job Oddities," May 1946 issue, page 114.

Modern Plastics, "Soundproofing With Plastics," July 1946, page 125.

Noise Control, "Eckel Corporation," advertisement, volume 2, No. 3, May 1956, page 1.